(12) United States Patent
Narasimhan

(10) Patent No.: US 7,929,010 B2
(45) Date of Patent: Apr. 19, 2011

(54) SYSTEM AND METHOD FOR GENERATING MULTIMEDIA COMPOSITES TO TRACK MOBILE EVENTS

(75) Inventor: Nitya Narasimhan, Schaumburg, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1509 days.

(21) Appl. No.: 10/692,623

(22) Filed: Oct. 24, 2003

(65) Prior Publication Data

US 2005/0090294 A1 Apr. 28, 2005

(51) Int. Cl.
*H04N 7/14* (2006.01)
(52) U.S. Cl. .................................... 348/14.01
(58) Field of Classification Search ............... 382/104; 348/14.01
See application file for complete search history.

(56) References Cited

U.S. PATENT DOCUMENTS

| | | | |
|---|---|---|---|
| 5,926,103 A | 7/1999 | Petite | |
| 5,926,210 A | 7/1999 | Hackett et al. | |
| 6,144,318 A * | 11/2000 | Hayashi et al. | 340/995.19 |
| 6,278,884 B1 | 8/2001 | Kim | |
| 6,292,745 B1 * | 9/2001 | Robare et al. | 701/208 |
| 6,304,754 B1 * | 10/2001 | DeSantis et al. | 455/436 |
| 6,336,035 B1 * | 1/2002 | Somoza et al. | 455/446 |
| 6,338,020 B2 * | 1/2002 | Hashimoto | 701/208 |
| 6,675,006 B1 | 1/2004 | Diaz et al. | |
| 6,690,918 B2 | 2/2004 | Evans et al. | |
| 6,754,488 B1 * | 6/2004 | Won et al. | 455/424 |
| 6,876,302 B1 | 4/2005 | Steeves | |
| 6,885,874 B2 | 4/2005 | Grube et al. | |
| 6,970,702 B1 * | 11/2005 | Martin | 455/424 |
| 6,993,354 B2 | 1/2006 | Momosaki et al. | |
| 7,058,409 B2 | 6/2006 | Hanninen et al. | |
| 7,079,810 B2 | 7/2006 | Petite et al. | |
| 7,079,945 B1 * | 7/2006 | Kaplan | 701/208 |

(Continued)

FOREIGN PATENT DOCUMENTS

CA 2357697 A1 12/2002

OTHER PUBLICATIONS

European Patent Office, "Communication", Feb. 25, 2008, pp. 1-3, EPC Appln. No. 04784767.8-1249, Rijswijk, Netherlands.

*Primary Examiner* — James M Hannett
(74) *Attorney, Agent, or Firm* — Hisashi D. Watanabe

(57) ABSTRACT

A wireless communication device (104) for providing guidance about surrounding conditions and a communication server (1000) for receiving data feeds from cooperative wireless devices are provided. The wireless communication device (104) comprises a device discovery mechanism (214, 302) to identify second devices (116-150) in a vicinity (106-114) of the device, a processor (306) to determine a coverage capability for each area surrounding the first device (104), and a display (208, 310) to represent the coverage capability of each area surrounding the first device. The communication server (1000) comprises a network interface (1002) to receive one or more data feeds associated with a location of a first device (104), a processor (1004) to associate each data feed with an area adjacent to the first device, and a display (1008) to represent surrounding cells surrounding the first device. One or more surrounding cells (1102-1118) show a data feed of the location of the first device (104), and each data feed is provided by a second device (116-150) located in the corresponding surrounding cell.

15 Claims, 12 Drawing Sheets

U.S. PATENT DOCUMENTS

| | | |
|---|---|---|
| 7,113,793 B2 * | 9/2006 | Veerasamy et al. ......... 455/456.1 |
| 7,126,583 B1 * | 10/2006 | Breed ............................ 345/158 |
| 2001/0043717 A1 | 11/2001 | Laumeyer et al. |
| 2002/0029108 A1 * | 3/2002 | Liu et al. ....................... 701/208 |
| 2002/0076003 A1 | 6/2002 | Zellner et al. |
| 2002/0129094 A1 | 9/2002 | Reisman |
| 2002/0141618 A1 | 10/2002 | Ciolli et al. |
| 2003/0227540 A1 | 12/2003 | Monroe |

* cited by examiner

SYSTEM AND METHOD FOR GENERATING MULTIMEDIA COMPOSITES TO TRACK MOBILE EVENTS

FIELD OF THE INVENTION

The present invention relates generally to the field of wireless communication devices having media sensor, such as cameras and microphones. In particular, the present invention relates to wireless communication systems and methods capable of collecting and analyzing media information, i.e., images, video and/or audio, about one or more incidents.

BACKGROUND OF THE INVENTION

A camera phone, i.e., a cellular phone having a camera attachment or built-in camera, provides a unique opportunity for its user. In particular, the combination of a camera and a wireless transceiver provides the user the ability to capture images and send the images to other cellular phones. Accordingly, users of camera phones have a communication advantage over users of cellular phones without cameras. If a law enforcement officer has a cellular phone capable of receiving and viewing such images, the camera phone user may send images relating to a crime incident to the law enforcement officer.

A wireless device user at an incident, such as a crime incident, may not have the ability to capture all views as desired, particularly if the user is in motion. For example, the user may not be situated at an optimal position relative to the incident and/or may not have the time to capture the images as he or she desires, particularly if the user is running to or from the incident. In fact, other device users in the vicinity of the incident may have opportunities to capture better views of the incident. Unfortunately, an efficient means for coordinating data capture from multiple users is not available.

Also, an individual may be located in an area with little human presence when an incident, e.g., a kidnapping, mugging, or robbery, occurs. In response, the incident will probably result in a high mobility response, particularly if the individual is alone at the incident and desires the assistance of others. For instance, an assault victim may flee from the attacker, or a kidnapping victim may be trapped in a moving vehicle driven by an abductor. In this type of situation, eye witnesses may be absent or too far away to give credible evidence, it may be difficult to track the incident without adversely attracting attention to the pursuit and potentially endangering the victim, and law enforcement personnel may not be able to receive real-time updates of the scene. Without real-time updates, the law enforcement personnel may be delayed in taking any counteractive measures to defuse or resolve the situation.

There is a need for a system and method that provides an individual with guidance for moving from a scarcely monitored area to a more highly monitored area. There is also a need for a system and method that reconstructs an incident based on data collected from an ad hoc collection of mobile devices. Personal safety of an individual may be enhanced if law enforcement personnel have the capability to monitor movements of the individual in real-time. It would be particularly helpful to utilize multimedia-capable devices in the individual's vicinity to monitor movements even when the individual is highly mobile.

DETAILED DESCRIPTION OF THE PREFERRED EMBODIMENTS

Figure 1:
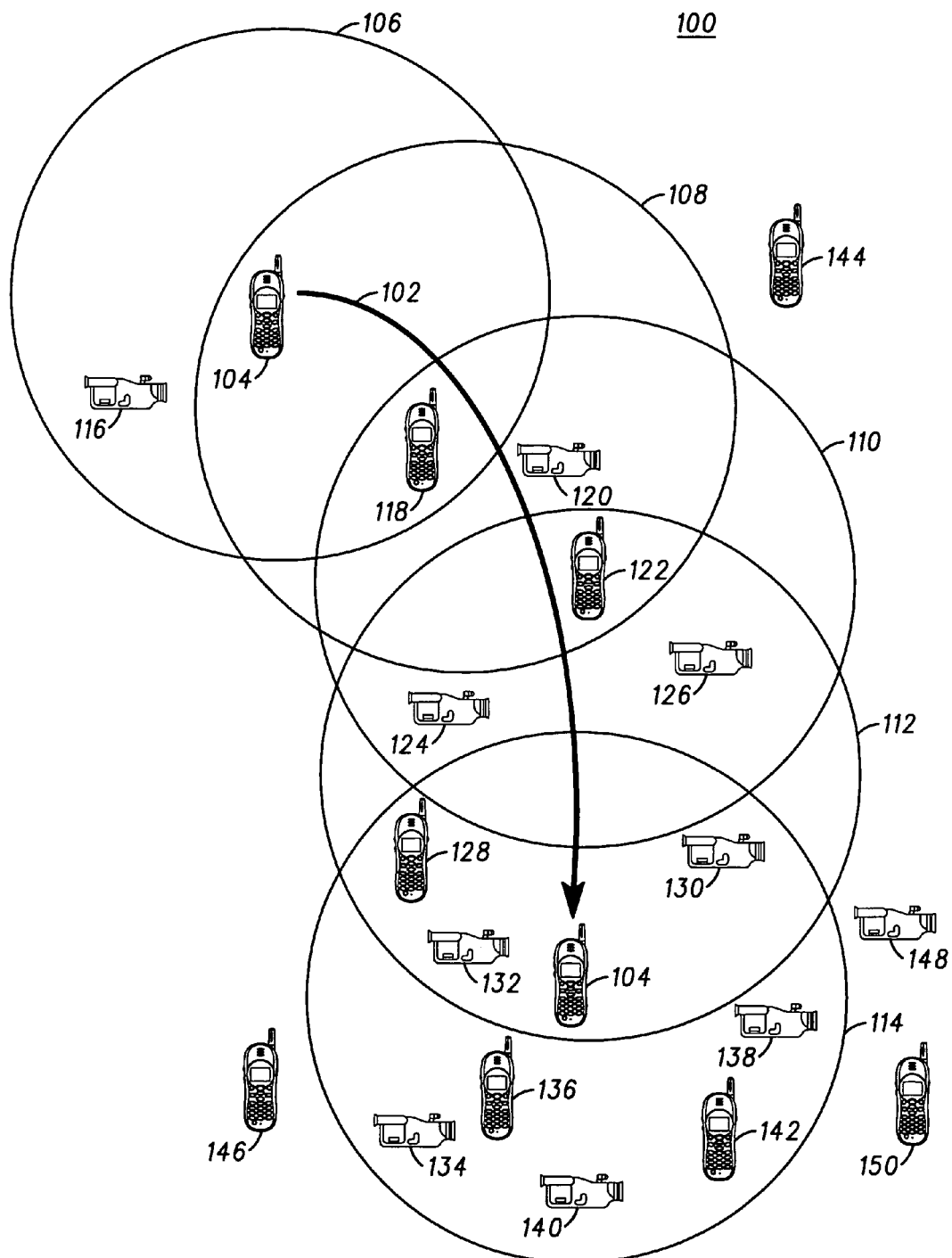
FIG. 1 is a diagrammatic view of a wireless communication device that travels from one point to another in accordance with the present invention.

The present invention is a system and method for generating composite multimedia images of events in real-time to track a moving subject. The user may be highly-mobile, so the system and method adapt to the changing location of the user by discovering and/or selecting devices dynamically to best fit the user's requirements at a given time. Real-time composite multimedia image of an incident may be generated by exploiting a prolific number of multiwireless media devices that surround the incident and its extending regions. A remote-controlled video camera is an example of a media device and may be located a wide variety of venues including, but not limited to, banks, airports, offices, private homes, traffic lights, public transport, and the like. The incident may be generally focused at or near an individual, and the generation of a composite may be triggered by the individual, such as selecting a key or a sequence of keys on his or her wireless communication device.

A device discovery mechanism performs a handshake operation that exploits short-range communication interfaces including, but not limited to, Bluetooth and IEEE 802.11, on the user's device to locate multimedia-devices in a neighborhood. A subset of the discovered devices is selected to match specific "viewing grid" requirements and, subsequently, enlist their services and/or feeds, if necessary. Multimedia-capable devices are selected dynamically to maximize visibility and coverage of an incident as a target moves through a neighborhood encompassing these devices. Optionally, the multimedia-capable devices may be prepped preemptively by other devices or by a central controller based on predicted directions of movement of the target. This would allow potential blind spots to be covered by alternative devices that will have to be reconfigured, for example, tilted or zoomed, temporarily to provide coverage of the anticipated target location.

Users entering unfamiliar areas or faced with an impending threat can activate their wireless communication devices in a passive mode and subsequently transition to an active mode in response to a user activation, such as a single key selection.

In passive mode, the user's device may discover friendly multiwireless media devices in a neighborhood and display on the user's device visual indications of the coverage in that area. An awareness mechanism provides a user with visual information, such as a colored grid on his or her display, of the multimedia coverage provided in different directions of movement from his or her current position. A user entering an unknown area can choose to move towards the better-monitored regions when navigating his or her way out.

For example, the display may show a 3×3 grid of icons representing the user's current location with the user's position represented by a center icon. The icons are distinguished, by color or some other distinguishing characteristic, to represent the degree of safety associated with a move in the direction represented by the icon. For example, icons may be green if at least one discovered multiwireless media device covers that area. Icons may be orange if a device exists in that area but is insufficiently-equipped or needs reconfiguration before it can provide comprehensive coverage. Red icons may indicate areas having no known multimedia coverage and should be avoided.

In active mode, the user's device triggers the discovered devices into performing some action, for instance, storing data feeds onto secondary storage for use in evidence and relaying data feeds to some specified trusted third party, such as, a law enforcement agency. Should the user's device have its own multimedia feed, such as an on-device camera, that feed is also transmitted to the same destination. The trusted third party may compile the received data feeds into a composite multimedia representation of the incident. In addition, the composite multimedia representation may be send to other entities, such as a law enforcement officer having a wireless communication device to receive and view the representation.

A server side mechanism reconstructs the composite viewing grid to route the incoming feeds to their respective icons in the grid. Thus, the server side mechanism provides a timely all-around view of the incident in real-time. Note that the properties, such as quality of image, visibility of device to target, etc., of the data feeds changes as the monitored entity moves. The viewer may obtain a relatively complete composite image of the scene from the user's perspective, e.g., the center icon which feeds from the user's device, as well as from the perspective of the devices surrounding the user's device.

One aspect is a display of a wireless communication device for providing guidance about monitoring devices within a surrounding area. The display comprises a central cell and cells surrounding the central cell. The central cell represents an area of the wireless communication device, and the surrounding cells represent areas surrounding the wireless communication device. Each surrounding cell has an appearance representing to a coverage capability of wireless media devices within the respective surrounding cell.

Another aspect is a wireless communication device for providing guidance to a user about surrounding conditions. The wireless communication device comprises a device discovery mechanism, a processor coupled to the device discovery mechanism and a display coupled to the processor. The device discovery mechanism is configured to identify surrounding devices in a vicinity of the wireless communication device. The processor is configured to determine a coverage capability for each area surrounding the wireless communication device based on the surrounding devices in each area. The display is configured to visually provide a representation of the coverage capability of each area surrounding the wireless communication device.

Yet another aspect is a method for a wireless communication device, having a display, to provide guidance to a user about surrounding conditions. The wireless communication device scans for at least one surrounding device in a vicinity of the wireless communication device. The wireless communication device then determines a coverage capability for each area surrounding the wireless communication device based on the at least one surrounding device in each area. Thereafter, the wireless communication device provides a visual representation of the coverage capability of each area surrounding the wireless communication device.

Still another aspect is a display of a communication server for receiving data feeds from cooperative wireless devices within a particular area. The display comprises a central cell and cells surrounding the central cell. The central cell represents a location of a first wireless device, and the surrounding cells represent areas surrounding the first wireless device. One or more surrounding cells show a data feed of the location of the first wireless device. Each data feed is provided by a second wireless device located in an area corresponding to the respective surrounding cell.

A further aspect is a communication server for receiving data feeds from cooperative wireless devices within a particular area. The communication server comprises a network interface, a processor coupled to the network interface, and a display coupled to the processor. The network interface is configured to receive one or more data feeds associated with a location of a first wireless device. The processor is configured to associate each data feed with an area adjacent to the first wireless device. The display is configured to visually provide a plurality of surrounding cells representing areas surrounding the first wireless device. One or more surrounding cells show a data feed of the location of the first wireless device. Each data feed is provided by a second wireless device located in an area corresponding to the respective surrounding cell.

A yet further aspect is a method for a communication server, having a display, to receive data feeds from cooperative wireless devices within a particular area. The communication server receives one or more data feeds relating to a location of a first wireless device. The communication server then determines a position of one or more second wireless devices relative to the first wireless device. Thereafter, the communication server provides a visual representation of a plurality of surrounding cells representing areas surrounding the first wireless device. One or more surrounding cells show a data feed of the location of the first wireless device. Each data feed is provided by a second wireless device located in an area corresponding to the respective surrounding cell.

Referring to FIG. 1, there is provided an exemplary system 100 in which a wireless communication device, such as a first reporting device 102, that travels along a path 102 from one point to another in accordance with the present invention. When an incident occurs near the first reporting device 104, the first reporting device scans for other wireless communication devices within the vicinity 106 of the first reporting device. For example, the first reporting device 104 may include and utilize a short-range transceiver to identify all wireless communication devices that are within communication range of the first reporting device. Examples of the protocol used by short-range transceivers include, but are not limited to, Bluetooth, IEEE 802.11 (such as 802.11a, 802.11b and 802.11g), and other types of WLAN protocols. As the first reporting device 104 travels along the path 102, the vicinity of the device follows, and is positioned about, the device. For example, as shown in FIG. 1, the vicinity of the first reporting device 104 changes from a first vicinity 106 to a second vicinity 108 to a third vicinity 110 to a fourth vicinity 112 and then, finally, to a fifth vicinity 114 as the device travels along the path 102.

The first reporting device 104 may include and utilize a longer-range transceiver to receive information about devices within the vicinity 106 of the first reporting device. Examples of the protocol used by longer-range transceivers include, but are not limited to cellular-based protocols, such as Analog, CDMA, TDMA, GSM, UMTS, WCDMA and their variants. Also, positioning system may be used by the wireless communication devices to determine its location. Examples of positioning systems include, but are not limited to, a Global Positioning System ("GPS") and a wireless signal triangulation system.

As shown in FIG. 1, other wireless communication devices or second reporting devices 116-150 may be situated generally near the path 102. Some second reporting devices 116-142 may be within a vicinity of the first reporting device 104 at one point or another, whereas other second reporting devices 144-150 may be beyond the vicinity of the first reporting device 104 regardless of where the device is located along the path 102. The second reporting devices 116 through 150 include at least one wireless transceiver and at least one sensor. Some second reporting devices may be mobile devices, such as devices 118, 122, 128, 136, 142, 144, 146, 148 & 150, whereas other second reporting devices may be stationary or fixed, such as devices 116, 120, 124, 126, 130, 132, 134, 138 & 140, such as surveillance cameras mounted to poles. Mobile devices include, but are not limited to, radio phones (including cellular phones), portable computers with wireless capabilities, wireless personal digital assistants, pagers, and the like.

When an incident occurs near the first reporting device 104, the first reporting device may desire to move from a scarcely monitored area to a more highly monitored area. Thus, as the first reporting device 104 travels along the path 102, the number of monitoring devices within its vicinity generally increases. For example, in FIG. 1, the first reporting device 104 detects two devices, namely second reporting devices 116 and 118, within its first vicinity 106. As it moves down the path 102, the first reporting device 104 detects three devices, namely second reporting devices 118, 120 and 122, within its second vicinity 108. Further along the path 102, the first reporting device 104 detects five devices, namely second reporting devices 118, 120, 122, 124 and 126, within its third vicinity 110. Still further along the path 102, the first reporting device 104 detects six devices, namely second reporting devices 122, 124, 126, 128, 130 and 132, within its fourth vicinity 112. Finally, at its destination, the first reporting device 104 detects eight devices, namely second reporting devices 128, 130, 132, 134, 135, 138, 140 and 142, within its fifth vicinity 114.

The first reporting device 104 and the second reporting devices within one of its vicinities 116-142 may try to capture data regarding a location of the first reporting device. However, not all wireless communication devices within a vicinity of the first reporting device 104 may be able to provide data relevant to the device. For example, certain devices may not have a line of sight to the first reporting device 104 or may not be within audible distance of the first reporting device.

The data collected from the wireless communication devices 104 & 116 through 142 may be communicated to a remote server. The data may be gathered by the first reporting device 104 and communicated to the remote server or sent directly to the remote server by each individual device, or a combination thereof. The data may be communicated to the remote server by any communication media available between the device or devices and the remote server, such as short-range wireless communication, longer-range wireless communication or landline communication.

Wireless communication devices may have the ability to capture single or multiple images. Examples of capturing multiple images include recording a continuous stream of images of an action event such as a crime, sports play, concert or other type of incident. In a multimedia application, the wireless communication devices might also capture and store high-quality audio and text/time-date, etc. Data captured by the wireless communication devices may be limited by each device's storage capacity, so a particular device may only record a fixed duration of a continuous image scene. Further, the wireless communication devices may capture and record a "continuous loop" of data by deleting/overwriting data as new data is captured, or deleting/overwriting an entire segment of data when the segment is full.

Figure 2:
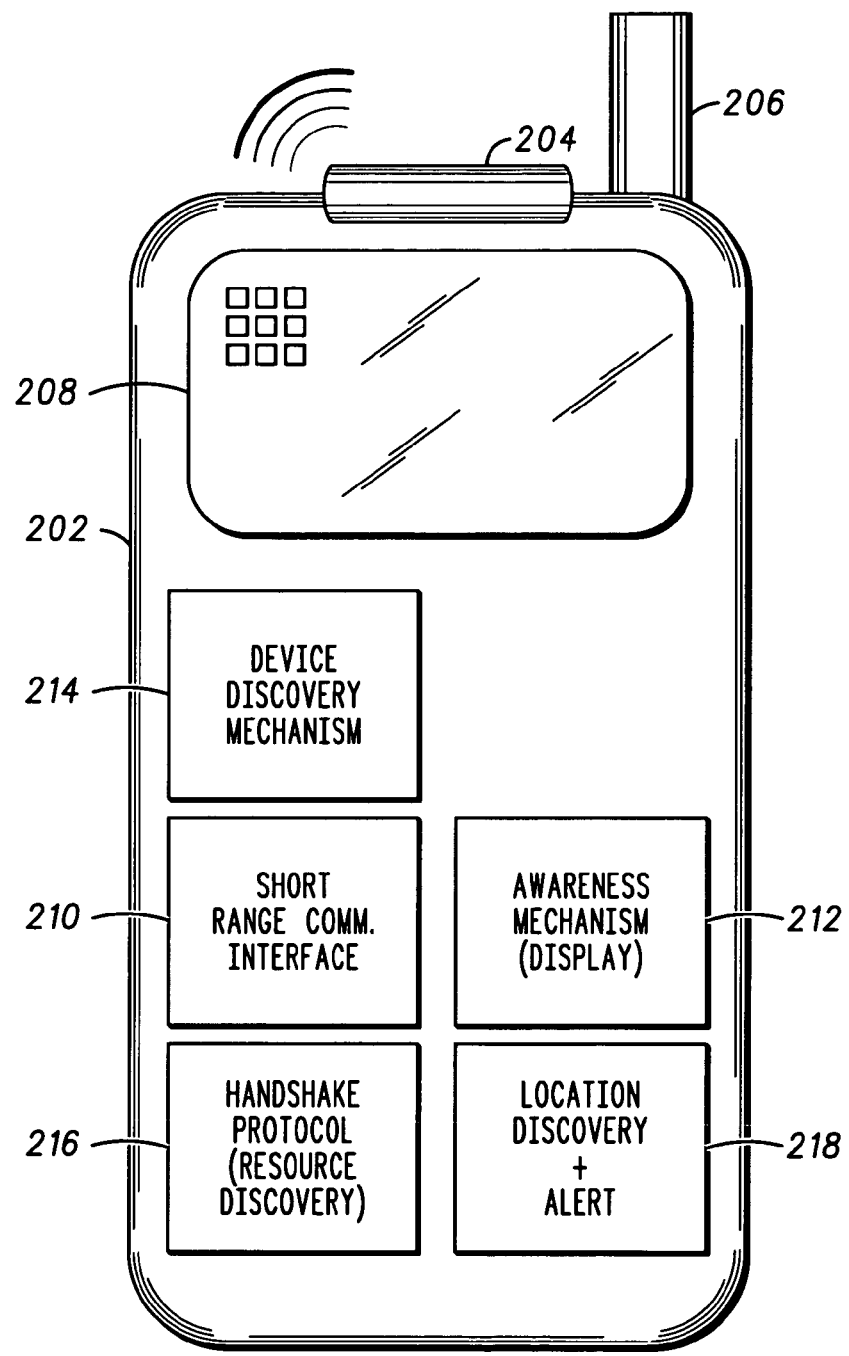
FIG. 2 is a block diagram representing exemplary components of the wireless communication device of FIG. 1.

Referring to FIG. 2, there is provided a block diagram representing exemplary components of the wireless communication devices, particularly the first reporting device 104. The components 200 include a housing 202 that is capable of supporting a short-range antenna 204, a longer-range antenna 206, and a display 208. The short-range antenna 204 operates in conjunction with a short range communication interface 210 to provide short-range communication such as, but not limited to, Bluetooth, IEEE 802.11 (such as 802.11a, 802.11b and 802.11g), and other types of WLAN protocols. The longer-range antenna 206, which is optional, operates in conjunction with a longer range communication interface (not shown) such as, but not limited to, cellular-based protocols, such as Analog, CDMA, TDMA, GSM, UMTS, WCDMA and their variants. The display 208 operates in conjunction with an awareness mechanism 212 to provide visual representations information to a user of the wireless communication device. For example, the display 208 may show a 3×3 grid at the upper right-hand corner that is color-coded in each cell to show the depth of coverage, or lack thereof, in each compass direction or direction relative to the device.

The housing 202 of the components 200 may also support a device discovery mechanism 214, a handshake protocol circuit 216, and a location discovery circuit 218. The device discover mechanism 214 operates in conjunction with the short-range antenna 204 and the short range communication interface 210 to scan for surrounding devices, such as a second reporting device 116-150, in a vicinity of the wireless communication device, such as a first reporting device 104 and establish communication with the surrounding devices. The handshake protocol circuit 216 provides resource matching between the wireless communication device and its surrounding devices based on the capabilities of the devices. Examples of such capabilities include, but are not limited to, audio support, video support, resolution, and remote control capabilities. The handshake protocol circuit 216 may also be used to pre-reserve data feeds of predetermined periods of time. The location discovery circuit 218 provides the location of the wireless communication device and may be capable of determining the location of each surrounding device if the short range communication interface 210 is able to obtain the necessary information to make this determination. In addition, the location discovery circuit may include alert capabilities that provide an emergency-style call (such as 911) that informs authorities of device location and identities of nearby devices.

Figure 3:
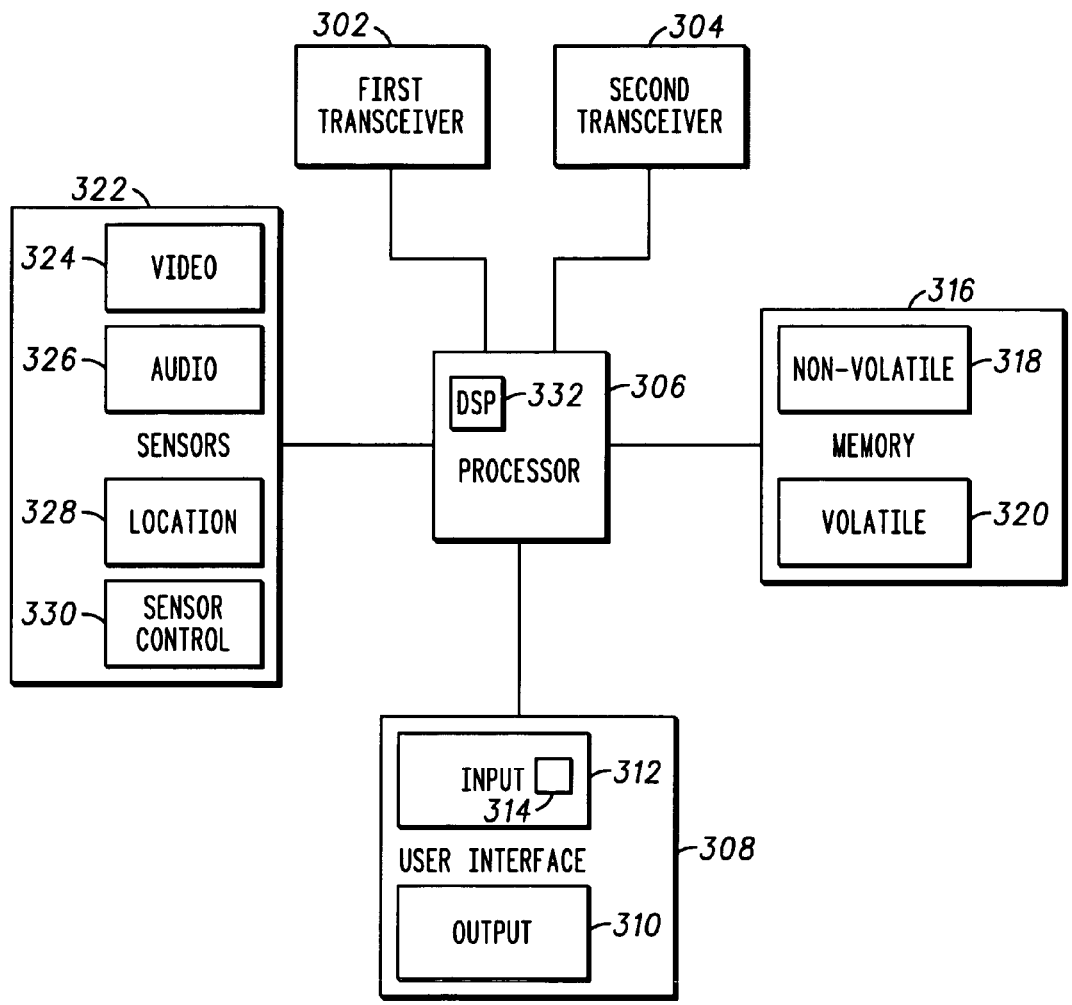
FIG. 3 is a block diagram representing exemplary components of various devices shown in FIG. 1.

Referring to FIG. 3, there is provided a block diagram representing exemplary internal components 300 of each device, namely the first reporting device 104 and the second reporting devices 116-150. The exemplary embodiment includes one or more transceivers 302, 304; a processor 306; and a user interface 308 that includes output devices 310 and input devices 312. The input devices 312 of the user interface include an activation switch 314.

Each wireless communication device must have at least one communication transceiver to communication with the other devices of the system 100. The first reporting device 104 has a short-range transceiver 302 for communication with the second reporting devices 116-150. The first reporting device 102 may also include a longer-range transceiver 304 for direct communication to other devices, such as a remote server, or may utilize the short-range transceiver for indirect communication to the other devices via another wireless communication device. Similar to the first reporting device 102, other second reporting devices 116-150 have a short-range transceiver 302 but may or may not have a longer-range transceiver 304.

To further clarify the functions of the wireless communication devices as represented by the internal components 300, upon reception of wireless signals, the internal components 300 detect communication signals and a transceiver 202, 204 demodulates the communication signals, individually or in combination, to recover incoming information, such as voice and/or data, transmitted by the wireless signals. After receiving the incoming information from the transceiver 302, 304, the processor 306 formats the incoming information for output to the output devices 310. Likewise, for transmission of wireless signals, the processor 306 formats outgoing information and conveys it to the transceiver 302, 304 for modulation to communication signals. The transceiver 304 conveys the modulated signals to a remote transceiver (not shown).

The input and output devices 310, 312 of the user interface 308 may include a variety of visual, audio and/or motion devices. The output devices 310 may include, but are not limited to, visual outputs (such as liquid crystal displays and light emitting diode indicators), audio outputs (such as speakers, alarms and buzzers), and motion outputs (such as vibrating mechanisms). The input devices 312 may include, but are not limited to, mechanical inputs (such as keyboards, keypads, selection buttons, touch pads, capacitive sensors, motion sensors, and switches), and audio inputs (such as microphones). The input devices 312 includes an activation switch 314 that may be activated by a user when a user desires initiating of the incident reporting function, as well as any other function, in accordance with the present invention.

The internal components 300 of the device further include a memory portion 316 for storing and retrieving data. The memory portion 316 includes a non-volatile memory portion 318 and a volatile memory portion 320. The non-volatile memory portion 318 may be used to store operating systems, applications, communication data and media data. The applications include, but are not limited to, the applications described below in reference to FIGS. 4 through 9 for operating a device. The communication data includes any information that may be necessary for communication with other devices, communication networks and wired devices. The media data includes any information that may be collected by sensors of the device, such as those sensors described below. The volatile memory portion 320 of the memory portion 316 provides a working area for processing data, such as digital signal processing of the data collected by the sensors. The processor 306 may perform various operations to store, manipulate and retrieve information in the memory portion 316. The processor 306 is not limited to a single component but represents functions that may be performed by a single component or multiple cooperative components, such as a central processing unit operating in conjunction with a digital signal processor and an input/output processor.

The internal components 300 of the wireless communication devices may further include one or more sensors 322. For example, as shown in FIG. 3, the sensors 322 may include a video sensor 324, an audio sensor 326 and a location sensor 328. Each sensor 324, 326, 328 may have its own sensor controller for operating the sensor, or a general sensor controller 330 may be used to operating all sensors. The video sensor 324 may collect a data feed such as still images, continuous video or both. The audio sensor 326 may be directed to collect certain types of data feed such as voice, non-voice or all sounds received. The location sensor 328 may be used to determine the position of the device and, thus, a GPS receiver is an example of a location sensor. It is to be understood that a single component of the device may operate as a component of the user interface 308 and a component of the sensors 322. For example, a microphone may be a user interface 308 to receive audio voice information for a phone call as well as a sensor 322 to receive ambient sounds for incident data collection.

At this point, an example for utilizing the internal components 300 may be helpful for understanding the interaction among these components. For example, the internal components 300 may comply with E-911 regulations, and a user may initiate an emergency call by activating the activation switch 314 of the user interface 308. The trigger of the activation switch 314 may be activation of a "panic button", detection of a high stress level of the user, detection of motion by a physical shock detector, or the occurrence of bright flashes or loud ambient noises. In response to receiving an activation signal from the activation switch 314, the processor 306 would then upload multimedia data from the location of the device, such as the incident scene. In particular, the processor 306 would instruct one or more sensors 324, 326, 328 and/or the sensor controller 330 to collect data and store the collected data in the non-volatile memory portion 318 of the memory portion 316. The sensors 322 may provide the collected data to the memory portion 316 directly or through the processor 306. The processor 306 may also gather data previously provided to the memory portion 316 by the sensors 322. In addition to finding data collected by its own sensors 322, the processor 306 may also find data collected by sensors of other wireless communication devices by sending a request signal via a transceiver 302, 304. The processor 306 may also utilize a transceiver 302, 304 to transmit collected data to a designated location or destination.

To protect against malicious misuse, the processor 306 may utilize certified public key methods and store security-related data or "keys" in the memory portion 316, preferably the non-volatile memory portion 318. The use of certificates may provide addition features for each device, such as dictating that any upload, once permitted, may be sent to a single destination of the user's choice. For example, a user may predetermine that all visual and audio records may only be sent to the Federal Bureau of Investigation ("FBI"). Subsequently, if the user permits an upload of certain records, the FBI would be the sole destination for these records.

It is to be understood that two or more components 300 may be integrated together within a single circuit or a single component may be subdivided into two or more separate circuits without departing from the spirit and scope of their purposes. For example, as shown in FIG. 3, the digital signal processor ("DSP") 332, which may perform video and/or audio intensive processing, may be integrated within the processor 306. However, the DSP 332 may be a component separate from the processor 306 without departing from the scope of the invention.

Figure 4:
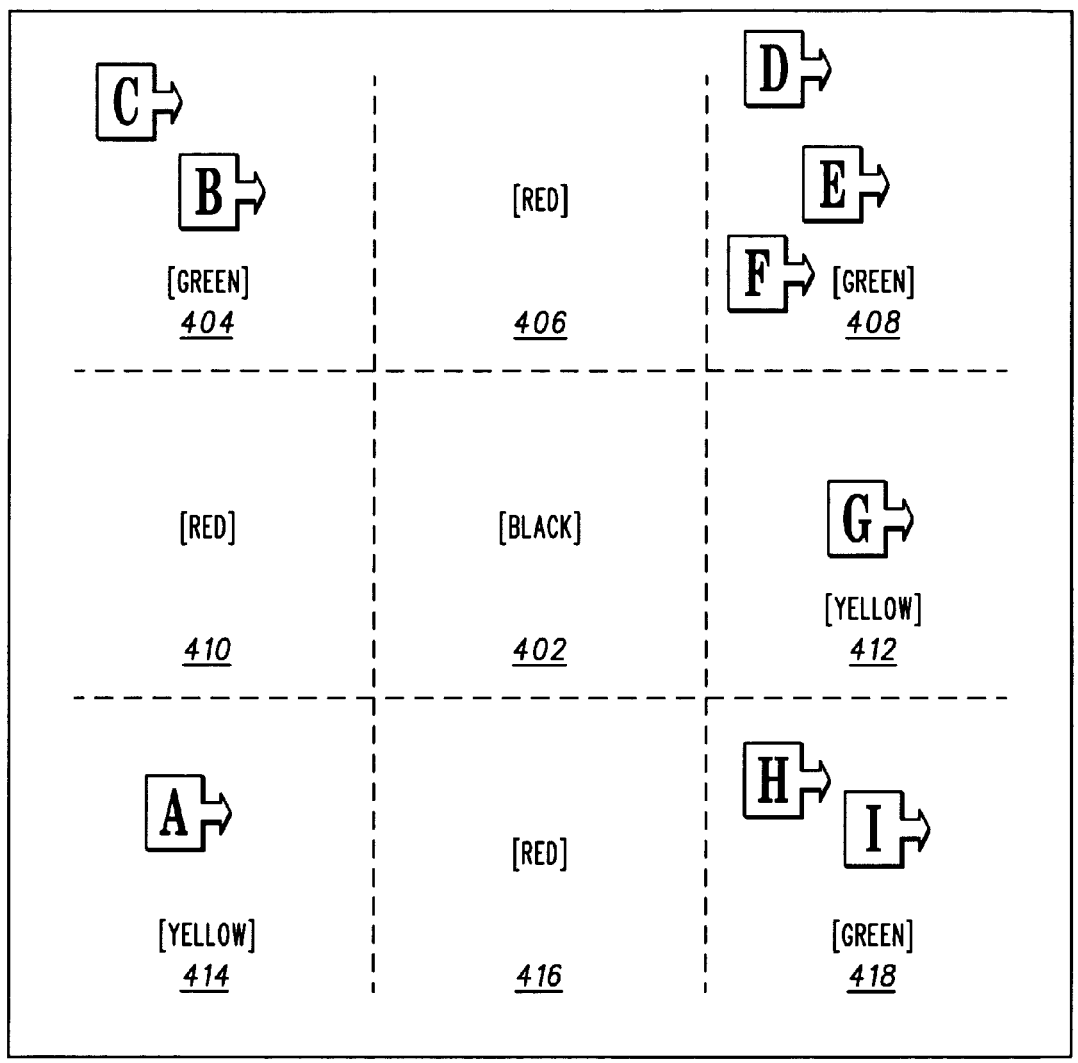
FIG. 4 is a viewing diagram representing an exemplary screen shot of a display of the wireless communication device of FIG. 1.

Referring to FIG. 4, there is provided a viewing diagram 400 representing an exemplary screen shot of the display 208, 310 of the wireless communication device, such as the first reporting device 104. For this exemplary screen shot, the diagram 400 may provide guidance about monitoring devices within a surrounding area by showing a central cell 402 and two or more surrounding cells 404-418. For this example, the central cell 214 may represent an area of the first reporting 104 device, and the surrounding cells 404-418 may represent areas surrounding the first reporting device that are populated by certain second reporting devices 116-150. Each surrounding cell 404-418 may have an appearance representing to a coverage capability of wireless media devices within the respective surrounding cell. For example, cell 404 may represent the coverage capability of devices to the front-left of the subject device, cell 406 may represent the coverage capability of devices to the front of the subject device, cell 408 may represent the coverage capability of devices to the front-right of the subject device, cell 410 may represent the coverage capability of devices to the left of the subject device, cell 412 may represent the coverage capability of devices to the right of the subject device, cell 414 may represent the coverage capability of devices to the back left of the subject device, cell 416 may represent the coverage capability of devices to the back of the subject device, and cell 418 may represent the coverage capability of devices to the back-right of the subject device.

The coverage capability of the second reporting devices 116-150 may be indicated by any type of method that distinguishes one cell having a certain coverage capability from another cell having a different coverage capability. Examples of characteristics that may indicate coverage capabilities includes, but are not limited to, color, shading, size, shape, intensity, effect (such as shadowing or outlining), style (such as bold and flashing), and the like. For example, green cells as represented by cells 404, 408 & 418 may indicate cells having high coverage, yellow cells as represented by cells 412 & 414 may indicate cells having medium coverage, and red cells as represented by cells 406, 410 & 416 may indicate cells having low coverage. The coverage capability of the central cell 214 may be, optionally, provided to assist the user to relatively gauge the surrounding cells 216-230 against the central cell. Having the benefit of knowing the coverage capability of areas about the wireless communication device, the user may move to increase coverage to increase his or her safety or ability to receive assistance.

The coverage capabilities of each cell may be determined based on the quantity of devices in each cell, the capabilities of the devices in each cell, or both. For example, as shown in FIG. 4, the cells having two or more devices indicate high coverage, i.e., green; the cells having at least one but less than two devices indicate medium coverage, i.e., yellow; and cells having less than one device indicate low coverage. Examples of device capabilities include, but are not limited to, still image capturing capabilities, continuous video capturing capabilities, audio capabilities, video/audio processing capabilities and wireless transmission capabilities.

Figure 5:
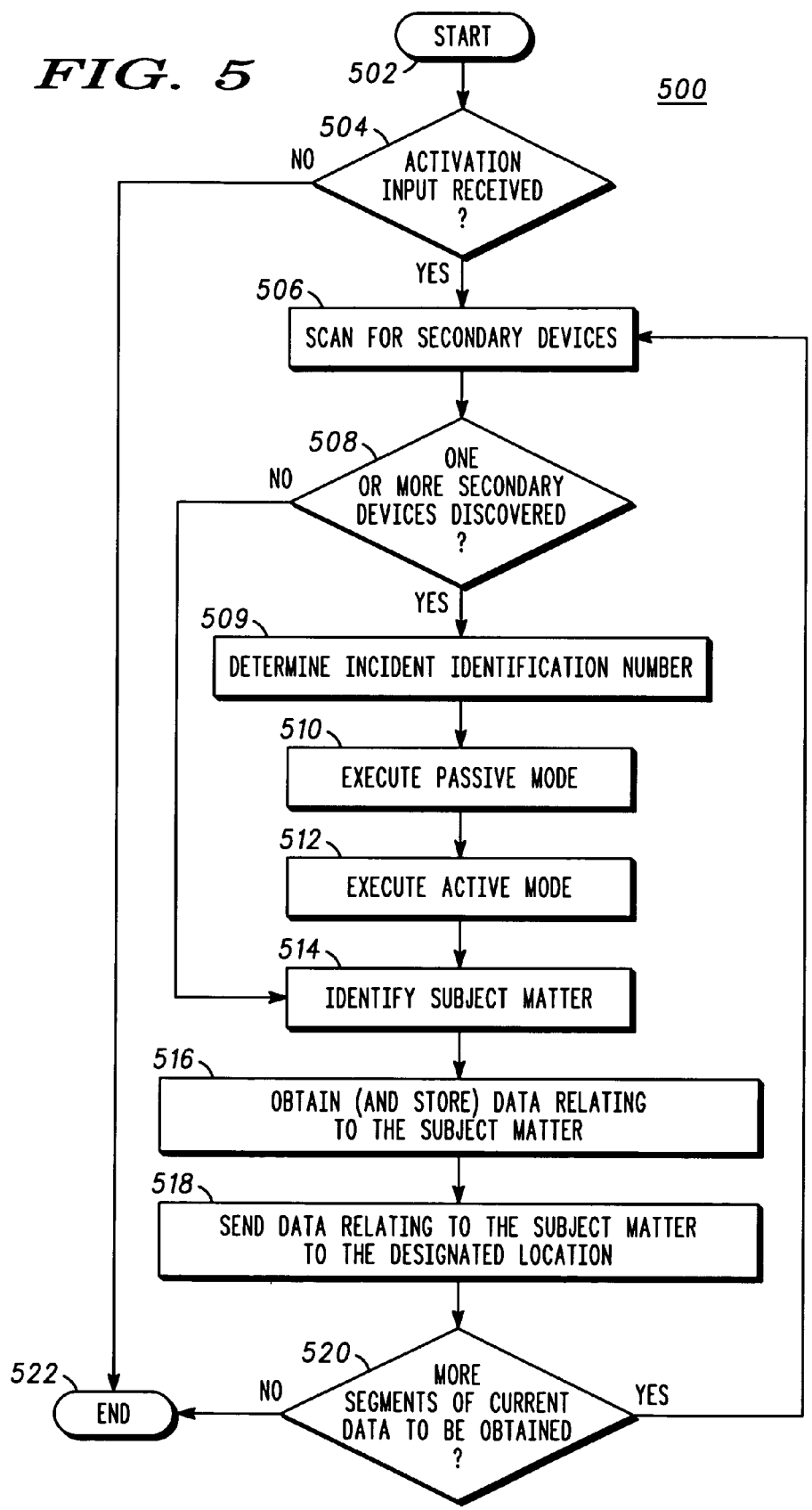
FIG. 5 is a flow diagram of an operation of the wireless communication device of FIG. 1.

Referring to FIG. 5, there is provided a flow diagram of an operation of the wireless communication device, particularly the first recording device 104. Beginning a step 502, the user interface 308 determines whether an activation input has been received from the user at step 504. If an activation input has not been received, the operation terminates at step 522. Otherwise, the transceiver 302 scans for secondary devices, such as second reporting devices 116-150, at step 506. If one or more secondary devices are discovered by the transceiver 302 at step 508, the processor 306 may determine an incident identification number for common reference by all concerned devices so that data from one incident is distinguishable from other incidents at step 509. The incident identification number may be a predetermined number or a number assigned by a communication server, and it is particularly useful for coordination of data and efforts for the active mode subroutine of step 512. For example, the processor 306 may contact a communication server to establish an incident identification number, such as the International Mobile Subscriber Identity ("IMSI") of the first reporting device 104. The transceiver 302 may then provide the incident identification number to the second reporting devices 116-150 so that, when the second reporting devices provided data to the communication server, the communication server will associate the data with the proper incident or the first reporting device 104.

The processor 306 may executed a passive mode subroutine at step 510, an active mode subroutine at step 512 or both. After executing one or both of the subroutines, or if secondary devices are not discovered, then the processor identifies the subject matter to be recorded at step 514. For example, the subject matter may be identified when the user points one or more sensors 322 towards an incident, makes a selection at the user interface 308 to activate capture of media, and the processor 306 utilizes pattern recognition to distinguish the subject matter of interest from background information.

Once the subject matter is identified at step 514, the processor 306 obtains the data relating to the subject matter at step 516. For example, the obtained data may be stored in the memory portion 316. For one embodiment, the stored data includes a date/time stamp corresponding to the date and/or time when the data was obtained. When a designated location, such as a communication server, receives the data, it may extract and utilize the date/time stamp when analyzing the data. The transceiver 302 then sends the obtained and/or stored data to a designated location, such as a remote server, at step 518. Next, at step 520, the processor 306 determines whether to obtain more data and return to step 506 or terminate the operation at step 522. For example, this determination may be based on user decision received by the user interface 308. It should be noted that, if the processor 306 determines that more data should be obtained at step 520, then the processor may return to any one of steps 510, 512, 514 and 516. For another embodiment, as shown in FIG. 5, the processor 306 may return to step 506 to scan for more devices, particularly if the wireless communication device has been in-motion since the last time a scan was performed.

Figure 6:
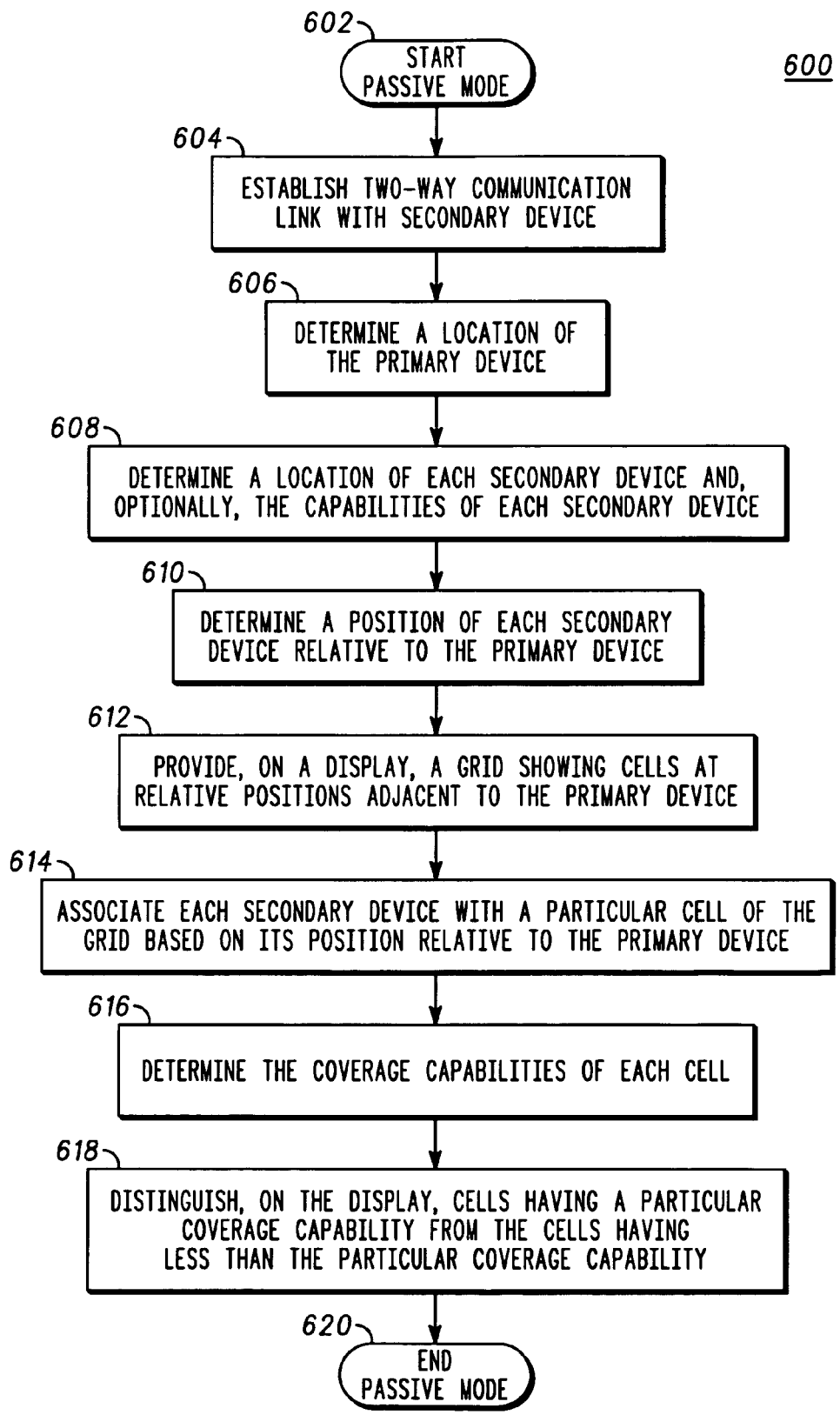
FIG. 6 is a flow diagram of a passive mode procedure that may be called by the operation of FIG. 5.

Referring to FIG. 6, there is provided a flow diagram of a passive mode procedure 600 that may be called by step 510 of the operation of FIG. 5. The passive mode procedure 600 begins at step 602, and the transceiver 302 establishes a two-way communication link with a discovered secondary device, such as a second reporting device 116-150, at step 604. The processor 306 then determines a location of the primary device, such as the first reporting device 104, based on information received from the location sensor 328 at step 606. Next, the processor 306 determines a location of each secondary device at step 608. Optionally, the processor 306 may also determine the capabilities of each secondary device. For example, the processor may determine the location and/or capabilities of each secondary device by sending a request for information to each secondary device via transceiver 302 and waiting for a response. Thereafter, the processor 306 may determine a position of each secondary device relative to the primary device by comparing the respective locations at step 610.

Once the relative position of each secondary device is determined at step 610, an output device 310 of the user interface 308 may provide a grid showing cells at relative positions adjacent to the primary device at step 612. The processor 306 may then associate each secondary device with a particular cell of the grid based on its position relative to the primary device at step 614. Next, the processor 306 may determine the coverage capabilities of each cell at step 616. As stated above, the coverage capabilities may be determined based on the quantity of devices in each cell, the capabilities of the devices in each cell, or both. Thereafter, the output device 310 may distinguish cells having a particular coverage capability from cells having different coverage capability at step 618, and the passive mode procedure 600 terminates at step 620.

Figure 7:
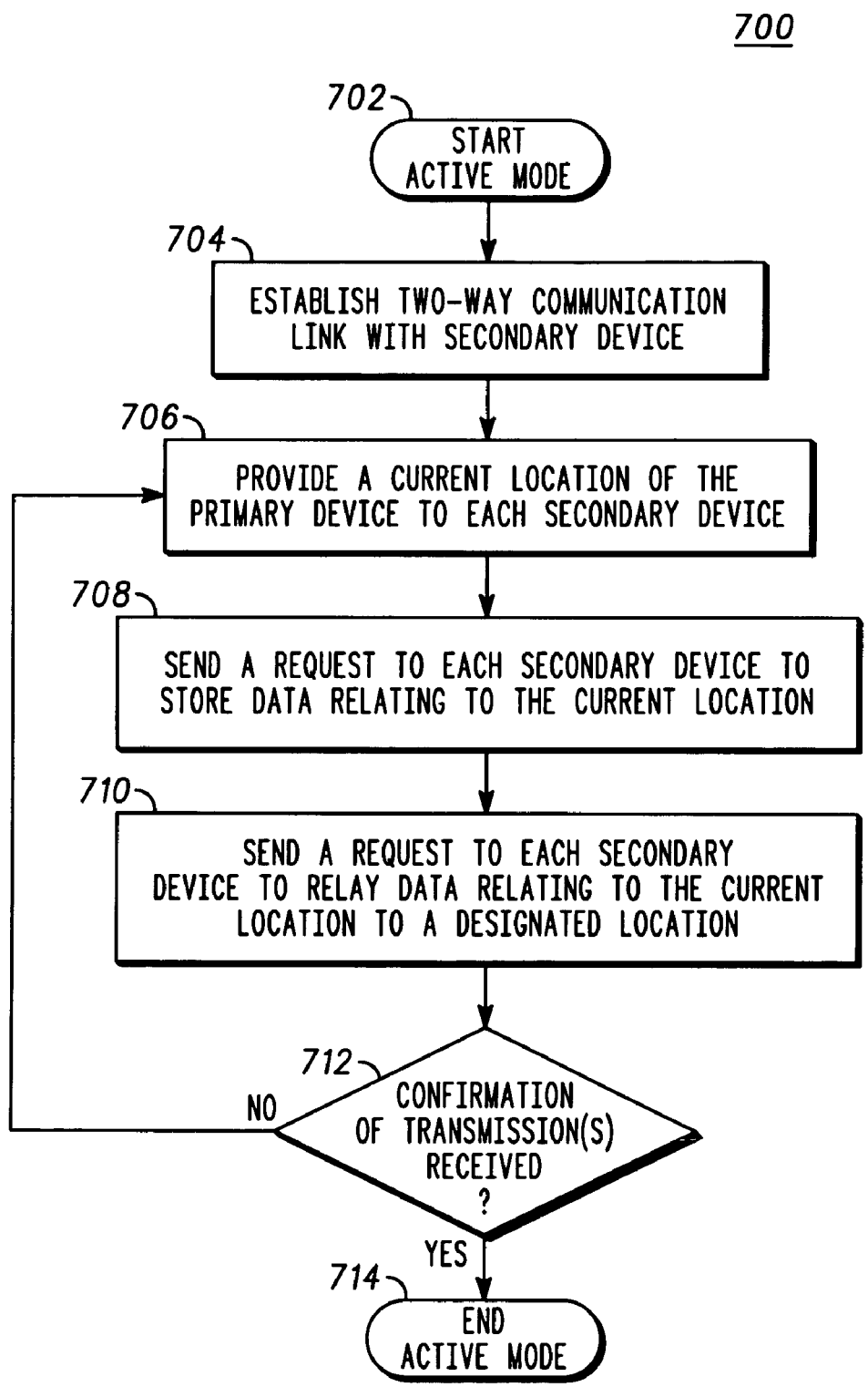
FIG. 7 is a flow diagram of an active mode procedure that may be called by the operation of FIG. 5.

Referring to FIG. 7, there is provided a flow diagram of an active mode procedure 700 that may be called by step 512 of the operation of FIG. 5. The active mode procedure begins at step 702, and the transceiver 302 establishes a two-way communication link with a discovered secondary device, such as a second reporting device 116-150, at step 704. The processor 306 then provides a current location of the primary device, such as the first reporting device 104, to each secondary device based on information received from the location sensor 328 at step 706. In addition to the current location of the primary device, the processor 306 may also provide predicted directions of movement of a target. Thus, the secondary devices will be directed to coverage to anticipated target locations. Next, the processor 306 sends a request to each secondary device to store data relating to the current location at step 708, to relay data relating to the current location to a designated location at step 710, or both. If confirmation of these transmissions is not received at step 712, then the processor 306 continues to send these requests at steps 706, 708 & 710 until a confirmation is eventually received. Once the processor 306 receives confirmation of the transmission or transmissions sent via transceiver 302, then the active mode procedure terminates at step 714.

Figure 8:
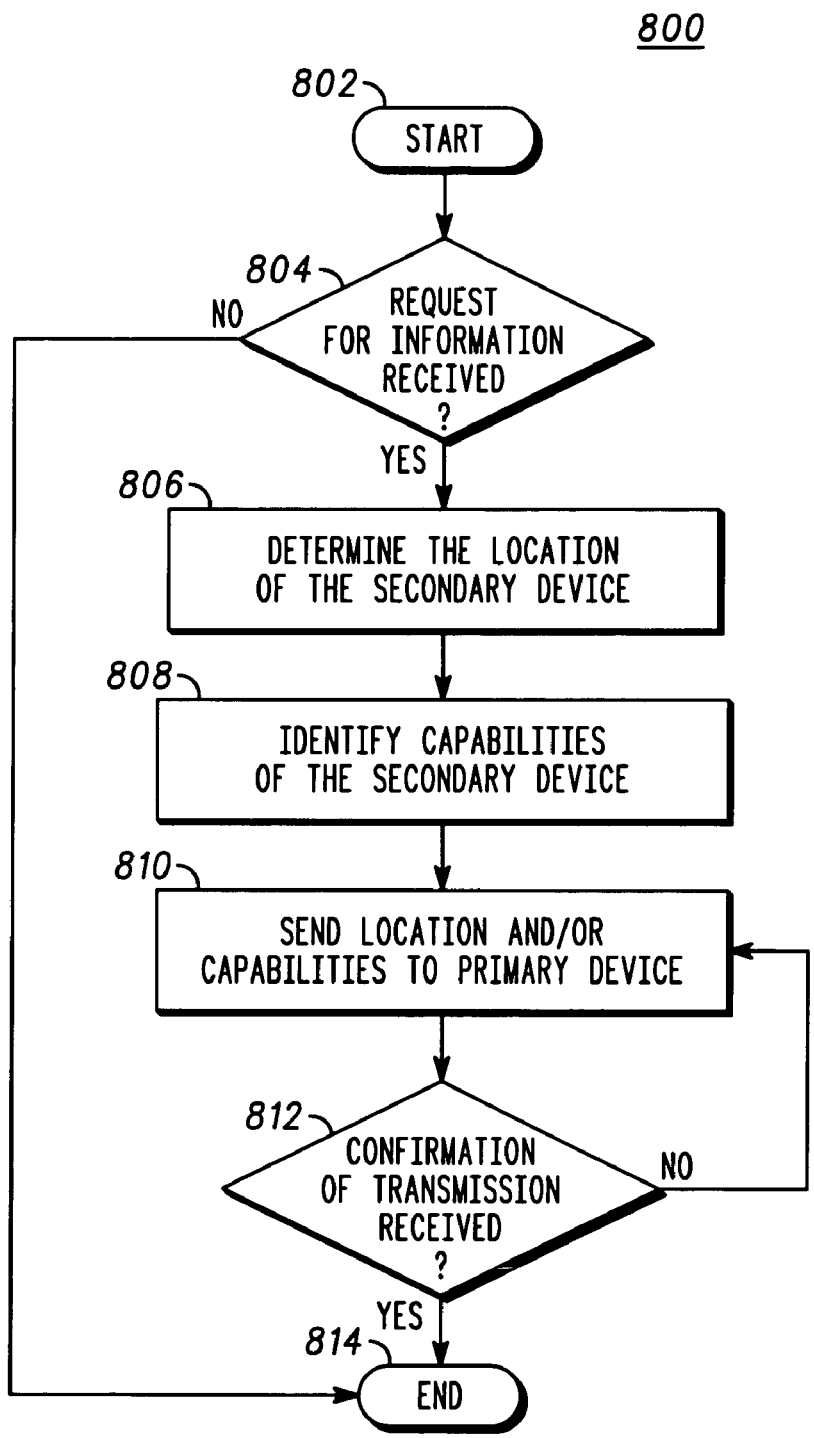
FIG. 8 is a flow diagram of an operation of various devices shown in FIG. 1 in response to the passive mode procedure of FIG. 6.

Referring to FIG. 8, there is provided a flow diagram of a passive mode response operation 800 of wireless communication devices, particularly the second reporting devices 116-150, that respond to a request of the passive mode procedure 600 by the primary device, such as the first reporting device 104. Beginning at step 802, the transceiver 302 determines whether a request for information has been received at step 804. If a request has not been received, then the passive mode response operation 800 terminates at step 814. Otherwise, the processor 306 determines the location of the secondary device, such as the second reporting device 116-150, based on information received from the location sensor 328 at step 806. If requested by the primary device, the secondary device may also identify its capabilities at step 808. For example, the secondary device may determine its capabilities by retrieving the information from the memory portion 316 or performing diagnostics on its sensors 322. Next, the transceiver 302 may send the location and/or capabilities to the primary device at step 810. The processor 306 may continue to instruct the transceiver 302 to send the information until a confirmation of received transmission is received by the transceiver at step 312. After the confirmation is received, the passive mode response operation 800 terminates at step 814.

Figure 9:
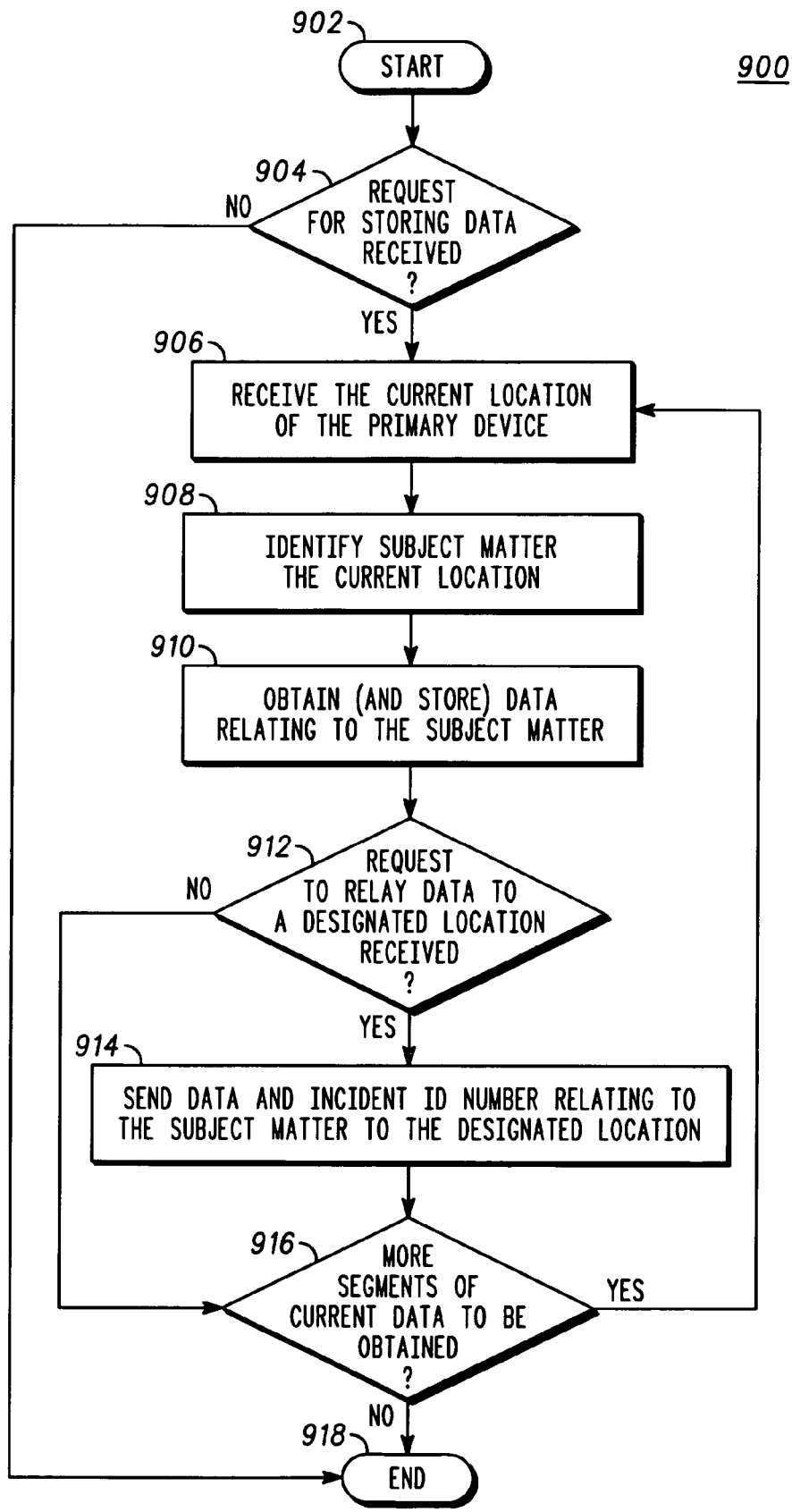
FIG. 9 is a flow diagram of an operation of various devices shown in FIG. 1 in response to the active mode procedure of FIG. 6.

Referring to FIG. 9, there is provided a flow diagram of an active mode response operation 900 of wireless communication devices, particularly the second reporting devices 116-150, that respond to a request by the active mode procedure 700 by the primary device, such as the first reporting device 104. For the exemplary operation shown by FIG. 9, it is assumed that a request to relay data would not be received unless a request of storing data is received. However, it is to be understood that the present invention also encompasses an embodiment in which a request for data may be received without a request of storing data.

Beginning step 902, the transceiver 302 determines whether a request for storing data has been received at step 904. If a request for storing data is not received, then the active mode response operation 900 terminates at step 918. Otherwise, if a request for storing data is received, then the transceiver 302 receives the current location of the primary device at step 906. Next, the processor 306 identifies the subject matter to be recorded at step 908. As described above, by example, the subject matter may be identified when the user points one or more sensors 322 towards an incident, makes a selection at the user interface 308 to activate capture of media, and the processor 306 utilizes pattern recognition to distinguish the subject matter of interest from background information. In addition, the transceiver 302 may receive predicted direction of movement of the target from the first reporting device 104. Based on this predicted direction information, the sensors 322 may be reconfigured to provide coverage of one or more anticipated target locations. In the alternative, the processor 302 may determine the predicted direction information based on historical location data collected for the primary device. Once the subject matter is identified at step 908, the processor 306 obtains the data relating to the subject matter at step 910. For example, the obtained data may be stored in the memory portion 316. For one embodiment, the stored data includes a date/time stamp corresponding to the date and/or time when the data was obtained. When a designated location, such as a communication server, receives the data, it may extract and utilize the date/time stamp when analyzing the data.

After the data is obtained and/or stored at step 910, the processor determines whether a request to relay data to a designated location has been received at step 912. If a request to relay data has been received, the transceiver 302 sends the obtained and/or stored data relating to the subject matter via the transceiver 302 to a designated location, such as a remote server, at step 914. Along the data, the transceiver 302 also sends an incident identification number so that the entity located at the designated location will be able to associate the data with its corresponding incident or the first reporting device 104. As described above, the incident identification number may be, for example, an IMEI of the first reporting device 104. If a request to relay data has not been received or after the data relating to the subject has been sent, then the processor 306 determines whether to obtain more data at step 916. If the processor 306 determines that more data should be obtained, then the active mode response operation 900 returns to step 906; otherwise, the processor terminates the operation at step 918.

Figure 10:
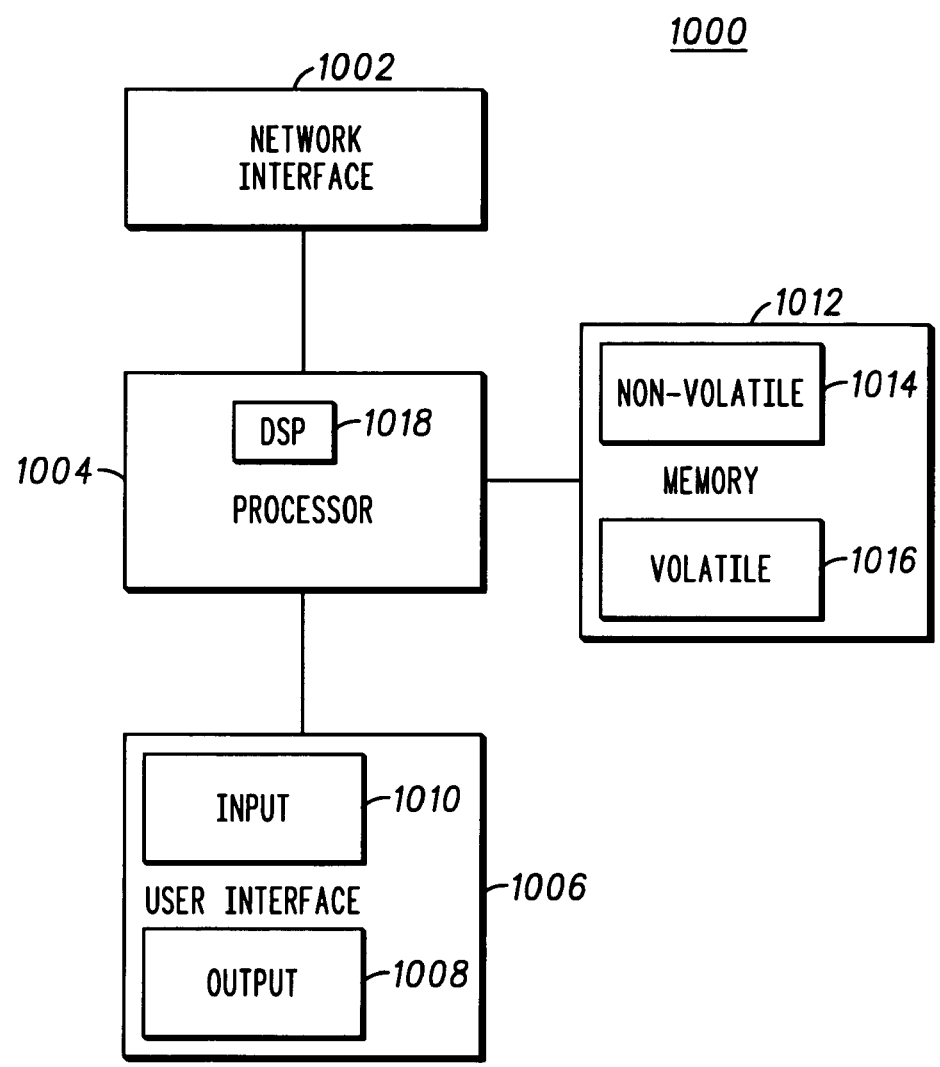
FIG. 10 is a block diagram representing exemplary components of a communication server in accordance with the present invention.

Referring to FIG. 10, there is provided a block diagram representing exemplary components of a communication server 1000 in accordance with the present invention. The communication server may be in communication with any or all of the wireless communication devices, including the first reporting device 104 and the second reporting devices 116-150. The exemplary embodiment includes a network interface 1002; a processor 1004; and a user interface 1006 that includes output devices 1008 and input devices 1010. The network interface may utilize any type of communication including, but not limited to, short-range wireless communication, longer-range wireless communication and wired communication. The output and input devices 1008 & 1010 of the user interface 1006 provide for general user operation of the server 1000.

The internal components of the server 1000 further include a memory portion 1012 for storing and retrieving data. The memory portion 1012 includes a non-volatile memory portion 1014 and a volatile memory portion 1016. The non-volatile memory portion 1014 may be used to store operating systems, applications, communication data and media data. The applications include, but are not limited to, the applications described below in reference to FIG. 12. The communication data includes any information that may be necessary for communication with other devices and networks. The media data includes any information that may be collected by sensors of wireless communication devices and sent to the network interface 1002. The volatile memory portion 1016 of the memory portion 1012 provides a working area for processing data, such as digital signal processing of the data collected by the sensors. The processor 1004 may perform various operations to store, manipulate and retrieve information in the memory portion 1012. The processor 1004 is not limited to a single component but represents functions that may be performed by a single component or multiple cooperative components, such as a central processing unit operating in conjunction with a digital signal processor and an input/output processor.

It is to be understood that two or more components 300 may be integrated together within a single circuit or a single component may be subdivided into two or more separate circuits without departing from the spirit and scope of their purposes. For example, as shown in FIG. 10, the digital signal processor ("DSP") 1018, which may perform video and/or audio intensive processing, may be integrated within the processor 1004. However, the DSP 1018 may be a component separate from the processor 1004 without departing from the scope of the invention.

Figure 11:
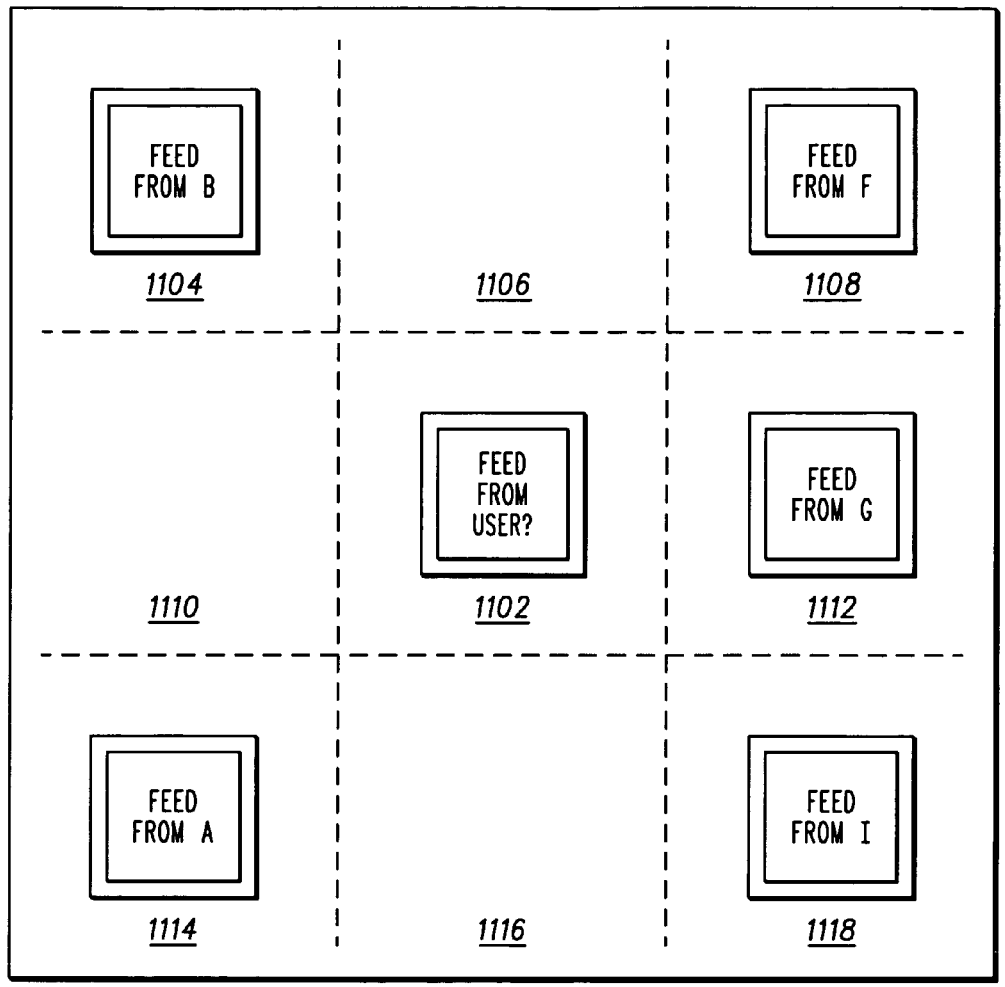
FIG. 11 is a viewing diagram representing an exemplary screen shot of a display of the communication server of FIG. 11.

Referring to FIG. 11, there is provided a viewing diagram 1100 representing an exemplary screen shot of the display of the output devices 1008 of the communication server 1000 in accordance with the present invention. For this exemplary screen shot, the diagram 1100 may illustrate how data feeds are received from cooperative wireless devices within a particular area by showing a central cell 1102 and two or more surrounding cells 1104-1118. For this example, the central cell 214 may represent a data feed received from the first reporting device 104, and the surrounding cells 404-418 may represent data feeds received from devices surrounding the first reporting device that are populated by certain second reporting devices 116-150. One or more surrounding cells 1104-1118 show data feeds of the location of the first wireless device 104. Each data feed may be provided by a second reporting device 116-150 located in an area corresponding to the respective surrounding cell.

Referring to FIG. 11 in conjunction with FIG. 4, a front-left area 404 relative to the first reporting device 104 may include two second reporting devices B and C. The server 1000 may compare the data feeds of these two devices to determine which data feed of is of greater value. A determination of a data feed's value may be based on, but not limited to, proximity of the second reporting device 116-150 to the first reporting device 104, quality of the received signal, quantity of relevant patterns detected in the data stream, detection of a particularly relevant pattern in the data stream, and the like. As shown in cell 1104 of FIG. 11, the server 1000 selected the data feed from device B to be shown in that cell. Similarly, a front-left area 408 relative to the first reporting device 104 may include three second reporting devices D, E & F. A shown in cell 1108, the server 1000 selected the data feed of device F to be shown in that cell. A similar selection process may be applied to devices H & I in cells 418 and 1118. For cells having only one second reporting device, such as device G in cell 412 and device A in cell 414, the server 1000 automatically selects the data feed of the only devices available, as shown by cells 1112 and 1114. For cells that do not have any second reporting devices, such as cells 406, 410 and 416, the server 1000 does not provide any data feeds to the display of the output devices 1008, e.g., cells 1106, 1110 & 1116.

Figure 12:
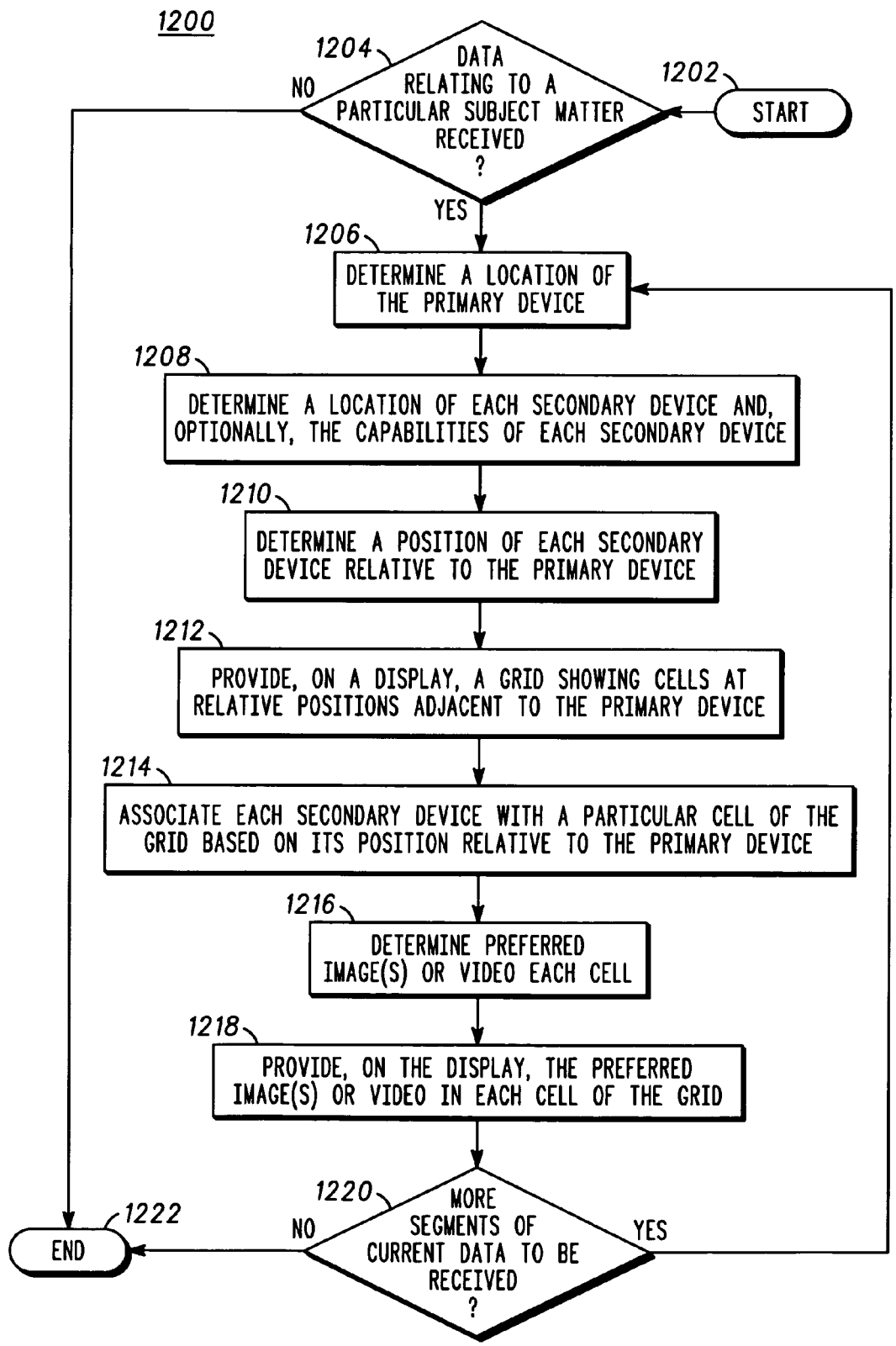
FIG. 12 is a flow diagram of an operation of the communication server of FIG. 10.

Referring to FIG. 12, there is provided a flow diagram of an operation 1200 of the communication server of FIG. 10. Beginning at step 1202, the processor 1004 determines whether data relating to a particular subject matter has been received by the network interface 1002 at step 1204. If data has not been received, then the operation 1200 terminates at step 1222. Otherwise, the processor 1004 determines a location of the primary device, such as the first reporting device 104, at step 1206. For example, the network interface 1002 may receive the location of the primary device from the primary device. The processor 1004 then determines a location of each secondary device, such as second reporting device 116-150, at step 1208. Optionally, the processor 1004 may also determine the capabilities of each secondary device. For example, the processor may determine the location and/or capabilities of each secondary device by sending a request for information to each secondary device via network interface 1002 and waiting for a response. Thereafter, the processor 1004 may determine a position of each secondary device relative to the primary device by comparing the respective locations at step 1210. In the alternative, the processor 1004 may receive the position of each secondary device relative to the primary device from the primary and/or secondary devices via network interface 1002 and, thus, will not to perform steps 1206 & 1208.

Once the relative position of each secondary device is determined at step 1210, an output device 1008 of the user interface 1006 may provide a grid showing cells at relative positions adjacent to the primary device at step 1212. The processor 1004 may then associate each secondary device with a particular cell of the grid based on its position relative to the primary device at step 1214. Next, the processor 1004 may determine the preferred media content, such as still image(s) or continuous video, for each cell at step 1216. Thereafter, the output device 1008 may provide the preferred media in each cell of the grid at step 1218, and determine whether more segments of current data should be received from the wireless communication devices 104 & 116-150 at step 1220. If more segments should be received, then the processor 1004 returns to step 1206; otherwise, the operation 1200 terminates at step 1222. For one embodiment, the processor 1004 may extract a date/time stamp from the data, if available, and synchronize the media provided on the display based on the date/time stamps of the media in the cells.

Once the media or multimedia composite representation is generated, the representation may be sent to one or more other entities in addition to, or in lieu of, showing the representation on a display. For example, the representation may be sent to wireless communication devices operated by law enforcement officers or individuals within proximity of the first reporting device 104 or the incident. Also, the communication server 1000 may be any type of processing device having communications capabilities. For example, the communication server 1000 may be another wireless communication device provided it includes the resources necessary to generate the media or multimedia composite representation.

The communication server 1000 may also preemptively prep one or more wireless communication devices based on predicted directions of movement of a target. This guidance by the communication server 1000 would instruct the wireless communication devices to direct coverage toward anticipated target location, such as potential blind spots that otherwise would not be covered.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A display of a communication server for receiving data feeds from cooperative wireless devices within a particular area, the display comprising:
    a central cell representing a location of a first wireless device; and
    a plurality of surrounding cells representing areas surrounding the first wireless device, at least one surrounding cell showing a data feed of the location of the first wireless device, each data feed being provided by a second wireless device located in an area corresponding to the respective surrounding cell.

2. The display of claim 1, wherein at least one surrounding cell includes a plurality of reporting devices and only one reporting device is selected to provide the data feed for each surrounding cell.

3. The display of claim 1, wherein the plurality of surrounding cells includes at least one surrounding cell without a corresponding data feed.

4. The display of claim 1, wherein the second wireless device provides the data feed to the communication server in response to receiving a request from the first wireless device to relay data relating to the location of the first wireless device.

5. The display of claim 1, wherein the central cell shows a data feed provided by the first wireless device.

6. A communication server for receiving data feeds from cooperative wireless devices within a particular area comprising:
    a network interface configured to receive at least one data feed associated with a location of a first wireless device;
    a processor, coupled to the network interface, configured to associate each data feed with an area adjacent to the first wireless device; and
    a display, coupled to the processor, configured to visually provide a plurality of surrounding cells representing areas surrounding the first wireless device, at least one surrounding cell showing a data feed of the at least one data feed, each data feed being provided by a second wireless device located in an area corresponding to the respective surrounding cell.

7. The wireless communication device of claim 6, wherein the processor selects a particular data feed for each area having more than one second wireless device.

8. The wireless communication device of claim 6, wherein the plurality of surrounding cells includes at least one surrounding cell without a corresponding data feed.

9. The wireless communication device of claim 6, wherein the second wireless device provides the data feed to the communication server in response to receiving a request from the first wireless device to relay data relating to the location of the first wireless device.

10. The wireless communication device of claim 6, wherein the display is further configured to visually provide a central cell showing a data feed provided by the first wireless device.

11. A method for a communication server, having a display, to receive data feeds from cooperative wireless devices within a particular area, the method comprising:
    receiving at least one data feed relating to a location of a first wireless device;
    determining a position of at least one second wireless device relative to the first wireless device; and
    providing a visual representation of a plurality of surrounding cells representing areas surrounding the first wireless device, at least one surrounding cell showing a data feed of the at least one data feed, each data feed being provided by a second wireless device located in an area corresponding to the respective surrounding cell.

12. The method of claim 11, further comprising selecting a particular data feed for each area having more than one second wireless device.

13. The method of claim 11, wherein providing a visual representation of a plurality of surrounding cells includes displaying at least one surrounding cell without a corresponding data feed.

14. The method of claim 11, wherein receiving at least one data feed relating to a location of a first wireless device includes receiving the at least one data feed from the second wireless device as initiated by the first wireless device.

15. The method of claim 11, wherein providing a visual representation of a plurality of surrounding cells includes providing a central cell representing a position of the first wireless device and a plurality of surrounding cells representing the areas surrounding the first wireless device.

* * * * *